United States Patent [19]
Wolfe et al.

[11] Patent Number: 4,763,325
[45] Date of Patent: Aug. 9, 1988

[54] DEMAND ASSIGNED REFORMATTING WITH AN OVERFLOW AREA FOR TIME DIVISION MULTIPLE ACCESS COMMUNICATION

[75] Inventors: William H. Wolfe, Burke; William P. Osborne, Leesburg, both of Va.

[73] Assignee: Comsat Telesystems, Inc., Fairfax, Va.

[21] Appl. No.: 772,536

[22] Filed: Sep. 4, 1985

[51] Int. Cl.$^4$ .............................................. H04J 3/16
[52] U.S. Cl. ........................................ 370/104; 370/95
[58] Field of Search ............... 370/99, 104, 79, 95; 455/12

[56] References Cited

U.S. PATENT DOCUMENTS

| | | | |
|---|---|---|---|
| 4,204,093 | 5/1980 | Yeh | 370/104 |
| 4,322,845 | 3/1982 | Fennel, Jr. et al. | 370/104 |
| 4,504,946 | 3/1985 | Raychaudhuri | 370/104 |
| 4,513,416 | 4/1985 | Fujiwara | 370/104 |
| 4,599,720 | 7/1986 | Kunzinger | 370/104 |

*Primary Examiner*—Douglas W. Olms
*Attorney, Agent, or Firm*—Sughrue, Mion, Zinn, Macpeak & Seas

[57] ABSTRACT

A time division multiple access communication system in which the repetitive frame is divided into fixed portions preallocated to separate stations and an overflow portion. Each station retains control of its own preallocated portion. Whenever one of the stations needs space that is not available in its preallocated portion, it requests a reference station for part of the overflow portion, which is relinquished as soon as the requirement stops.

5 Claims, 3 Drawing Sheets

DEMAND ASSIGNED REFORMATTING WITH AN OVERFLOW AREA FOR TIME DIVISION MULTIPLE ACCESS COMMUNICATION

BACKGROUND

The invention relates generally to communication systems. In particular, the invention relates to the dynamic reformatting of a time division multiple access frame dependent upon the demand of the attached stations.

Figure 1:
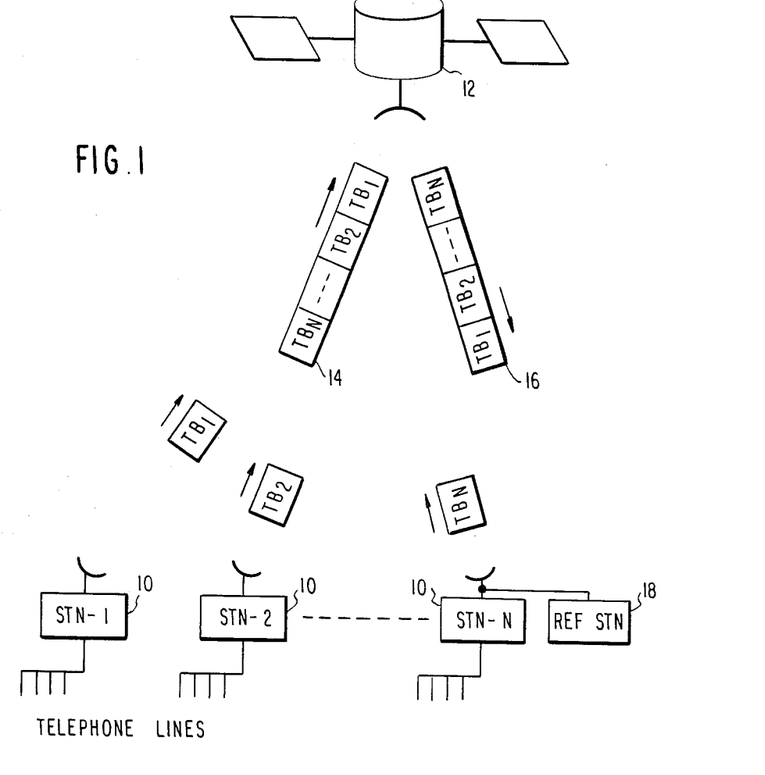
FIG. 1 is an illustration of a time division multiple access communication system.

Many modern, large-scale communication systems rely upon geosynchronous satellites acting as transponders between the transmitting and receiving stations. Although originally used for point-to-point communication between two ground stations, more recent satellite communication systems link together a substantial number of ground stations, offering selective communication between any pair of the ground stations. Such a system is schematically illustrated in FIG. 1 for N ground stations 10 linked together by a communication satellite 12 in geosynchronous orbit. The illustrated system is designed for telephone communications with each station 10 being associated with a telephone regional office. Whenever a telephone connection is desired between two telephone lines connected to different regional offices, the call is routed through the associated ground station 10 and is transmitted from there, through the satellite 12, to the appropriate receiving ground station 10.

Older satellite communication systems relied upon frequency allocation between the transmitting ground stations 10. However, more recent multi-point systems, particularly those designed to support telephone/data communications, have adopted a TDMA (time division multiple access) approach. Such a system is disclosed by Maillet in U.S. Pat. No. 3,649,764. In a TDMA system, data is not transmitted continuously but is time multiplexed. The transmission is divided into time frames 14 and 16 with each frame being further subdivided, according to a predetermined format, into traffic bursts TB. Both data and voice signals are transmitted in digital form. The frames repeat often enough that a telephone conversation can be made to appear continuous and instantaneous. In the illustrated example, each ground station 10 is assigned one traffic burst. The transmission of the traffic bursts from the individual ground stations 10 are synchronized so that they arrive at the satellite 12 in the proper time sequence to form the up-link frame 14. The communication satellite 12 receives the up-link frame 14 and retransmits the frame as the down-link framep 16. Although the satellite 12 amplifies and frequency shifts the up-link frame 14 into the downlink frame 16 and perhaps uses part of the frame for housekeeping purposes, the satellite 12 can be viewed as a passive transponder with the up-link frame 14 being identical to the down-link frame 16. It is of course to be appreciated that the frames 14 and 16 illustrated in FIG. 1 are only one pair of a nearly continuous series of up-link frames and down-link frames, the frames in each series being separated by the minimum necessary time.

The entire down-link frame 16 is received by each of the N stations 10 so tht each station 10 is receiving the transmissions of every other station 10. The individual traffic burst TB must contain additional information indicating for which of the ground stations 10 the transmission is intended.

In a TDMA system, a reference station 18 is usually present to provide some degree of coordination between the ground stations 10. At a minimum, the reference station 18 must synchronize the ground stations 10 so that the frames 14 and 16 are synchronized between the stations 10 and furthermore it synchronizes the traffic bursts TB within the frame.

One of the difficulties of a telephone-based communication system is the fluctuation in the loads of the various ground stations 10. These flucions may be either statistical or predictable. A statistical fluctuation arises because the ground stations 10 has no control on the number of requests for a telephone connection and this number statistically varies with time. A predictable fluctuation would arise from different times of day for ground stations 10 located in different time zones. Nonetheless, for a consumer-based telephone/data system, there must be a high probability that, when a connection is demanded, channel capacity is available. If the frame format is fixed, this requirement for availability means that there must be a large amount of excess capacity within each of the traffic bursts TB. This in turn implies a relatively high bandwidth system.

Bandwidth is both scarce and, in the case of the satellite 12, expensive to support because of the correspondingly increased power level. Alternatively, for a fixed bandwidth, the excess capacity required for a high availablity with a fixed format implies a decreased number of reliably available channels.

In view of the problems of a fixed allocation between the multiple ground stations 10, demand assigned multiple access (DAMA) has been developed. By DAMA is meant that the allocation of time or bandwidth between the ground stations 10 is dynamically allocated according to a real-time demand for channel capacity demanded by the individual ground stations 10. Demand assigned multiple access has been traditionally used in single channel per carrier satellite communication systems, that is, frequency division rather than the time division illustrated in FIG. 1. Examples of these systems include the SPADE system, which has been implemented in the INTELSAT network. In the SPADE system, each earth station 10 communicates with all other stations 10 via a wide band common signalling channel. All call requests are communicated via this channel among all the stations 10 in the network. The different carrier channels, corresponding to different frequencies, are allocated to the different ground stations 10, according to these requests. Each station 10 maintains a data base that represents the frequency assignments for all carrier frequencies in the transponder of a satellite 12. The SPADE system represents a decentralized approach to channel allocation.

Other satellite systems have been designed for centralized control of single channel per carrier satellite communication networks. For example, a master control computer located in a reference station 18 polls each of the earth stations 10 in the network for call requests and thereafter assigns satellite frequencies as required to set up the desired calls. Both of the described DAMA systems have been used with frequency division rather than time division communication. However, demand assignment for a TDMA system is described by Edstrom in U.S. Pat. No. 3,848,093. It is not felt that either the centralized or the decentralized approaches are totally appropriate for a TDMA system.

A totally decentralized system does not make efficient use of the channel capacity, assuming that there must be a high probability for completing a call request. A totally centralized system such as that of Yeh in U.S. Pat. No. 4,204,093, or of Rothauser et al. in U.S. Pat. No. 4,096,355, although efficient in call channel capacity, introduces excessive complexity and delays caused by the rapidly changing system configuration. Torng in U.S. Pat. No. 4,383,315 and Fennel, Jr. et al in U.S. Pat. No. 4,322,845 disclose a mixture of centralized and decentralized control. These problems with totally centralized or decentralized control will now be explained.

In a demand assigned TDMA network, the process of establishing a communication link between earth stations 10 requires the originating earth station to process the incoming call request from the telephone lines to determine the destination for this call. This call processing will result in a request for a portion of the TDMA frame in which to carry the traffic associated with the call, whether it be for voice or data communication. If a full duplex connection is required, as is the case for a typical voice call, then two requests will be generated. For a typical satellite transponder, between two and four call requests per second can be expected. Larger systems are designed with multiple transponders so that multiple frames are being received simultaneously. The allocation, or management of the TDMA frame, can be either centralized at the reference station 18 or decentralized among the ground stations 10.

Figure 2:
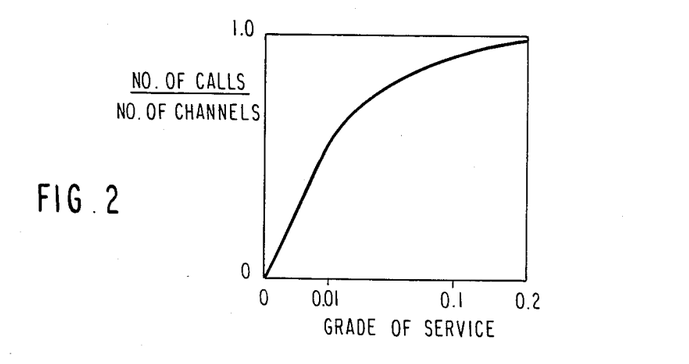
FIG. 2 is a graph illustrating the relationship between the utilization of channels in a communication network and the resultant grade of service.

A full evaluation of the benefits and disadvantages of the two approaches requires the introduction of some com unication terminology. Grade of service (GOS) is the probability that a call request cannot be honored by a station 10 because no space can be allocated to it. Obviously in a consumer market, the overall GOS should be minimized to prevent the undue occurrence of busy signals. As the number of calls approaches the number of available channels, the grade of service deteriorates, that is, GOS increases. A typical relation between the percentage usage of the channels and the grade of service is shown in FIG. 2, presented solely for illustrative purposes. Such curves vary depending upon system design. For an economically efficient system, the number of calls should approach the number of channels. However, this increased efficiency inevitably degrades the grade of service. On the other hand, a low value for the grade of service is desirable for high quality service, but it is economically expensive. An erlang is another measure of channel usage, particularly appropriate for TDMA systems. An erlang is the number of call-seconds per second for the system as whole. Obviously, a higher number of erlangs implies an efficiently used system. Because there are multiple channels handling multiple calls in a TDMA system, a TDMA system typically has an erlang value greater than one.

If the frame management functions for a TDMA system are centralized at the reference station 18, then the resultant system efficiently uses the available capacity. For instance, for a TDMA network having a raw capcity of 465 full duplex circuits, a fully centralized network can support 425 erlangs of traffic with a grade of service GOS=0.01. Although these parameters are impressive, such a system nonetheless has several drawbacks. The 2–4 call requests per second will require a very large computer at the reference station 18. The call requests all pass through the communication satellite 12 located approximately 36,000 miles above the ground stations 10 and the reference station 18. As a result, the delays associated with the propagation of the request to the reference station 18 and of the reply to the requesting station 10 can become appreciable, approaching 1 second. Each ground station 10 must reconfigure its timing controls to conform to a reconfigured TDMA frame. If this reconfiguration is occuring at the rate of 2–4 times a second, the frame management processing at each of the ground stations 10 becomes appreciable and additional channel capacity must be provided for the frequent call requests and resultant reconfiguration data. It is to be remembered that in a frequency division system, the frequencies are individually allocated so that the reallocation of one frequency does not require a complete reallocation of all the frequencies.

If, on the other hand, frame management were totally decentralized, each earth station 10 would have one segment or traffic burst of the TDMA frame for which it had the management responsibility. With this approach, the total network traffic capacity would be a function of the number of stations 10 in the network since each station must maintain a separate reserve capacity to satisfy the required grade of service. If the previously described TDMA network of 465 circuits was required to maintain the same grade of service among 30 stations 10, the fully decentralized approach would support 320 erlangs of full duplex traffic, a reduction from the 425 erlangs of the totally centralized approach. However, if the number of stations is increased to 100, the maximum full duplex traffic that could be supported falls further to 166 erlangs. Thus, system delays and complexity are reduced in the fully decentralized TDMA system but only at the expense of a significantly reduced traffic capacity.

SUMMARY OF THE INVENTION

Accordingly, it is an object of this invention to provide a time division multiple access communication sytem of low complexity.

It is a further object of this invention to provide a TDMA communication system that efficiently uses the available channel capacity.

It is yet another object of this invention to provide, in a single demand assigned multiple access communication system, the best features of centralized and of decentralized frame management.

The invention can be summarized as a method of frame management in a time division multiple access communication system in which a fixed time frame is divided into segments that are assigned to separate stations. Each station is responsible for the management of its own segment. The frame is further provided with an overflow area. Whenever a station overflows the capacity of its own assigned segment, a request is made to a central station to assign a small slot in the overflow area to that station. The control of the slot reverts to the central station when its use by the station terminates.

DETAILED DESCRIPTION OF THE PREFERRED EMBODIMENT

In the time division multiple access (TDMA) system of the present invention, the TDMA frame is divided into a preallocated segment and an overflow segment. Every station is given a portion of the preallocated segment over which it exercises control. Whenever a station requires additional channel capacity that cannot be satisfied by its preallocated portion, it requests the reference station to allocate it part of the overflow segment. The reference station thus controls the overflow segment.

Figures 3, 5:
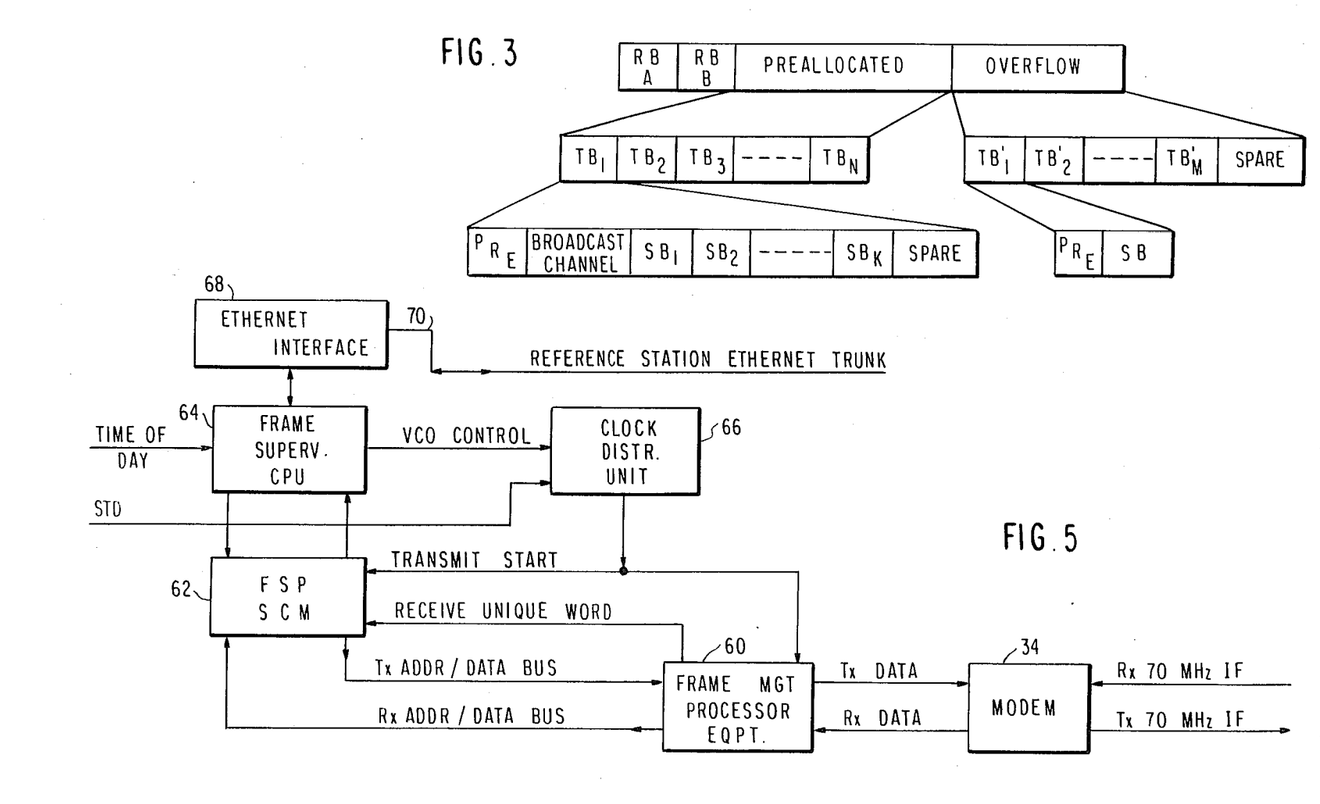
FIG. 3 is a timing diagram for a TDMA system of the present invention.
FIG. 5 is a block diagram for the electronics in the reference station.

One embodiment of the format for a TDMA frame of the present invention is shown in FIG. 3. The frame begins with two reference bursts $RB_a$ and $RB_b$ which are separately assigned to each of two reference stations. Two independent reference stations are provided to provide redundancy and thus additional reliablity. Only one reference station at any one time is exercising control over the system. It is only when the first reference station fails that the second reference station asserts control over the system. Accordingly, the remaining discussion will assume only a single controlling reference station 10. The reference bursts $RB_A$ and $RB_B$ contain the transmissions of the reference stations 18. These transmissions include information about its own health as well as control information for the satellite 12 and for the individual ground stations 10. The control informaion allows all ground stations 10 to be synchronized with the reference station 18.

A preallocated segment is subdivided into traffic bursts $TB_1$–$TB_N$. Each of the traffic bursts are assigned to one of the N ground stations 10. The size of the individual traffic bursts $TB_1$–$TB_N$ varies according to the needs of the individual ground stations 10. The size at the traffic bursts $TB_1$–$TB_N$ are chosen so that the GOS of each traffic burst is held in the range of 0.05–0.30. These sizes are selected by the reference station 18 but only on a fairly infrequent basis, for example, half-hourly. In between the adjustment times, the i-th ground station 10 to which the traffic bursts $TB_i$ is assigned has control of that traffic burst $TB_i$.

The format of a preallocated traffic burst $TB_i$ is also shown in FIG. 3. It begins with a preamble PRE, used for control information. This control information is used by the ground station 10 to acquire a burst and to identify the beginning of the data portion of the burst. The traffic burst $TB_i$ contains a broadcast channel. This broadcast channel is of fixed size and is always allocated to the respective ground station 10. Typically, the broadcast channel is used for control and status information transmission and not for telephone calls. It is thus assumed that the broadcast channel is always needed by the respective ground station 10.

Following the broadcast channel are a plurality of slots that are assigned to variable length sub-bursts $SB_1$–$SB_K$. Unused slots are kept in a spare area. Each of the sub-bursts $SB_1$–$SB_K$ is associated with one telephone/data call. The ground station maintains control over the allocation of the sub-bursts to the slots. As illustrated in FIG. 3, it is assumed that the sub-bursts $SB_1$–$SB_K$ have been compacted to the left so that all spare slots appear on the right. Compaction is not required for the practice of the invention.

The overflow area of the TDMA frame is also divided into a number of slots. Each of the overflow slots is assigned to one of the traffic bursts $TB'_1$–$TB'_M$. Unused slots represent spare overflow capacity. Each of the overflow traffic bursts $TB'_i$ consists of a preamble PRE and an overflow sub-burst SB. The overflow sub-burst SB is the same size as would be required for a preallocated sub-burst $SB_i$ and thus corresponds to a single telephone call.

In operation, whenever the i-th ground station 10 receives a request for a telephone/data connection from one of its lines, it first attempts to find preallocated spare capacity in its own traffic burst $TB_i$ so that it can add another sub-burst $SB_i$ thereto. If the spare capacity is available, the call can be completed through the satellite 12 without the assistance of the reference station 18. If, however, existing traffic sub-bursts $SB_1$–$SB_K$ completely fill the traffic burst $TB_i$ so that no preallocated spare capacity remains, then the ground station 10 signals the reference station 18 that a channel is required. The reference station 18 then attempts to find spare capacity in the overflow segment for the insertion of another overflow traffic bursts $TB'_i$. If the overflow spare capacity is available, the reference station 18 makes the allocation and then transmits this fact to the requesting ground station 10. The ground station 10 then associates the telephone call with the sub-burst SB of the newly allocated overflow traffic burst $TB'_i$. If the overflow spare capacity was not initially available, the reference station 18 so notifies the requesting ground station 10 and the telephone call is blocked.

Once the call has been completed, the ground station 10 originating that call receives a call clear message and then sends an overflow slot release message to the reference station 18. The reference station 18 reassigns the now vacant overflow traffic burst to its spare capacity.

All information concerning the destination of the sub-bursts SB and $SB_i$ is transmitted from the ground stations 10 in the broadcast channel.

Thus it is seen that the formatting control is both centralized and decentralized. The control is decentralized in the respect that each of the ground stations 10 exercises control of its own preallocated traffic burst $TB_i$. Control is centralized in the respect that the reference station 18 maintains control over all of the overflow segment. However, the centralized control by the reference station 18 is required only when the respective preallocated traffic bursts $TB_i$ does not have spare capacity. Thus a large fraction of the control is decentralized.

By the use of the invention, although the GOS in the preallocated traffic bursts $TB_1$–$TB_N$ are in the range of 0.05–0.30, the overall GOS is about 0.01.

The dynamic reformatting capability of this invention is being built into a communication system which initially includes 30 ground stations. A simplified electronic structure for each ground station is shown in the block diagram of FIG. 4. Terrestrial interface equipment is composed of any number of plesiochronous CEPT-32 interface units (CIUs) 30 and asynchronous/synchronous pulse-stuffing CEPT-32 interface units 32, operating at 2048 kilobits per second. The plesiochronous CIU 30 buffers data and signaling information between the ground station and the terrestrial telephone network. One plesiochronous CIU 30 provides for a duplex interface for one CEPT-32 terrestrial digital trunk. Inherent in the design of the plesiochronous CIU 30 is a split-channel capability. This capability allows for individual channels to be removed from multiple CEPT-32 trunks to form a TDMA burst on the transmit side and for individual channels to be collected from multiple TDMA bursts and hence from multiple sources, to form a single CEPT-32 trunk on the receive side. The plesiochronous CIU 30 is designed to operate in either synchronous or plesiochronous mode, that is, in either a master or slave mode.

Figure 4:
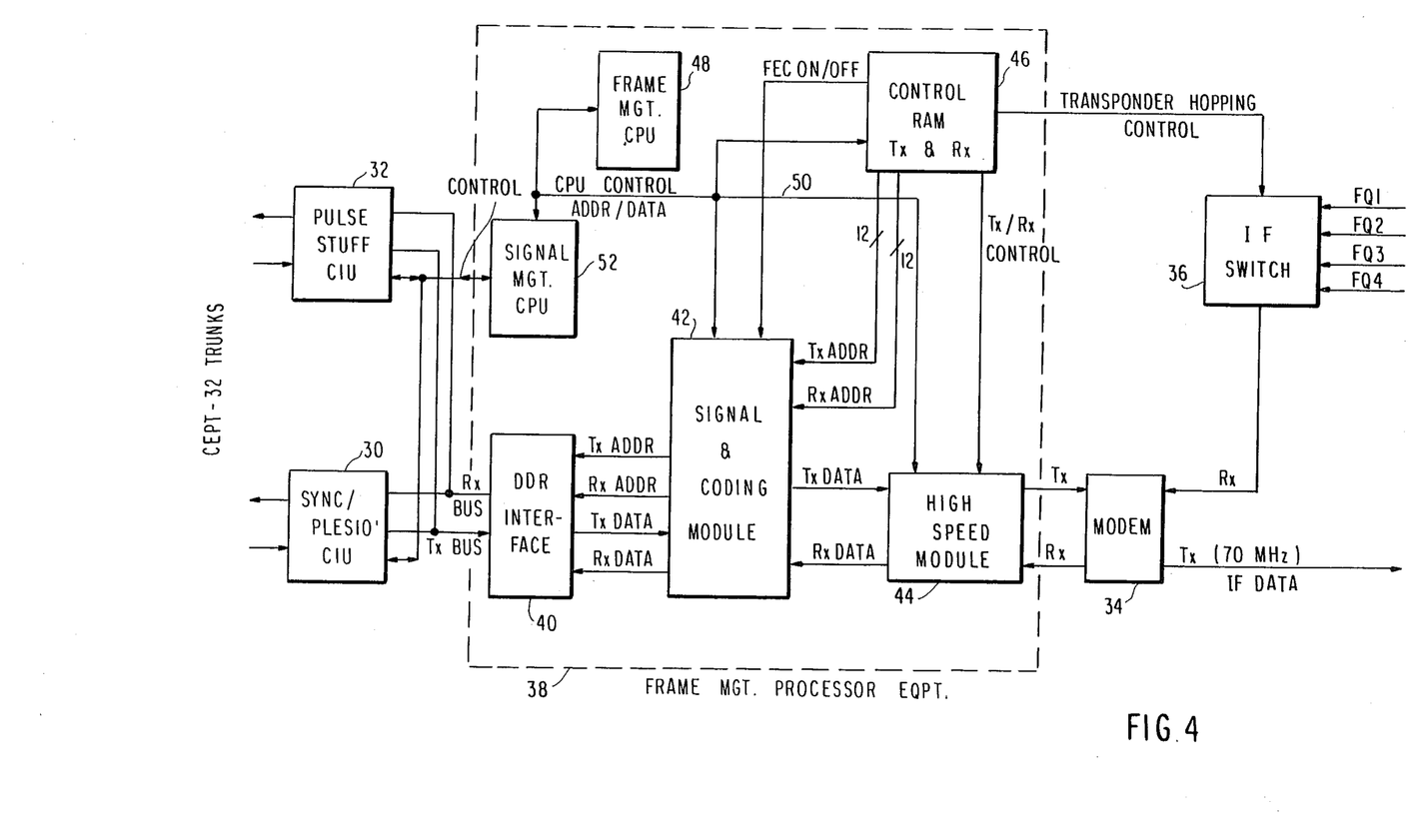
FIG. 4 is a block diagram for the electronics in a ground station.

The asynchronous/synchronous pulse-stuffing CIU 32 provides a duplex interface to the ground station for an asynchronous 2.048 megabyte per second data string and is fully compatible with CCITT Recommendations G.703 and G.912. The pulse-stuffing CIU 32 performs bit stuffing on the incoming data stream to synchronize it to the ground station. In addition, it compresses this continuous data stream into a burst suitable for transmission over the satellite. On the receive side, the high speed data bursts received from the satellite are expanded into a continuous low speed data stream. Bit destuffing is then performed to restore the rate and the content of the data stream, which is then sent to the terrestrial telephone network.

On the satellite side of the ground station, transmission data is modulated by a MODEM 34 at an IF frequency of 70 MHz and sent to a transmitter, not shown, which further modulates the IF data to the RF transmission frequency. An RF receiver, not shown, receives the down link transmissions from the satellite. There are, in fact, four separate transponders and the receiver provides separate IF receive lines FQ1-FQ4 for the four channels. An IF switch 36 selects one of these four IF lines FQ1-FQ4 for connection to the receive input of the MODEM 34.

The MODEM 34 provides the functions of interfacing the data, clock and control signals. It is a QPSK modulator/demodulator and provides the carrier source for the 70 MHz IF carrier. The MODEM 34 further provides control and IF loop back switches. When the MODEM is receiving data from the satellite, it recovers the clock from the received signal.

A differential driver/receiver interface 33 converts single-ended bus related signals on the telephone network side into a differential form for transmission within the chassis.

Frame management processor equipment is the heart of a ground station. It is a microprocessor-based subsystem which controls the operation of the ground station. The frame management processor equipment performs several principal functions. The equipment acquires and keeps track of the satellite frame with a nominal frame length of 18 ms. It keeps the local TDMA clock frequency locked to the received signal. The frame management processor equipment transmits the ground stations traffic bursts at their assigned time position in its allocated time slot. It multiplexes voice, data and, if desired, video sub-bursts derived from digital trunks in the terrestrial telephone network. The frame management processor equipment accepts call requests from the telephone network and establishes a sub-burst for those requests. The assignment of the sub-bursts must be made in conjunction with the destination ground station and additionally, if the overflow pool is to be used, in conjunction with the reference station.

The components of the frame management processor equipment 38 will be described as follows. A signal and coding module 42 performs two primary functions. First of all, it performs the error correction encoding and decoding of the traffic data in order to improve the bit error rate of the traffic channel over the satellite link. The second function of the signal and coding module 42, the function of importance for this invention, is that of message handling for all control information exchanged between processors of different ground stations and the reference station. This control information is transmitted in the broadcast channel that is the first sub-burst of every burst, except for the overflow traffic burst $TB'_i$ of the overflow pool.

A high speed module 44 performs those functions that deal directly with the serialized satellite data and the high speed, 29.952 MHz clock. These functions include the serializing/deserializing of data between the serial data link and the parallel buses of the frame management processor equipment 38. The high speed module 44 transmits the frame start timing and retimes the data received from the demodulator to the local clock. It further generates and adjusts the local clock.

A control RAM 46 in conjunction with a frame management CPU 48 forms a microprocessor based controlsequence generator. The events occuring during each TDMA frame are controlled by this sequence of control and address signals. The sequence lasts the length of the frame. The sequence can be changed by the frame management CPU 48 on a frame-by-frame basis. Two independent control sequences are generated, one each for the transmit side and the receive side pipelines of the frame management processor equipment 38. The sequences consist of a linked series of control words. Each control word corresponds to a frame-related event. The events occur during each satellite frame and the duration of those events are stored as words in the control RAM 46. Twelve of the 32-bits within the control words are addresses for the buses to the CIUs 30 and 32. Other bits are used as control bits for various activities including the loading of a counter which controls the length of time an address stays on the bus. Other bits are used for system control functions such as gating the carrier and turning the error correction on and off.

The frame management CPU 48 is a general purpose microcomputer system, designed specifically for use as an intelligent controller/computer in various roles throughout the entire communication system. The same basic hardware module is used in four different applications as a CPU.

The frame management CPU 48 provides three primary functions. It controls the structure of the frame by loading the control RAM 46 with microinstructions which form the sequence of outputs produced by that control RAM 46. It acquires and maintains synchronization of the frame by monitoring the reference burst position and by adjusting the system clock frequency through its interface with the high speed module 44. It also monitors the status of the modules attached to its bus 50 and generates status messages for the reference station. These messages are sent through the satellite via the signal and coding module 42. The status messages include requests to the reference ground station for an additional sub-burst $TB'_i$ in the overflow pool. When a call in the overflow pool has been completed, the disconnection requests is likewise sent from the frame management CPU 48 to the reference station in a status message. The reference station also makes use of the information contained in the status messages to perform its periodic reformatting of the preallocated traffic bursts $TB_i$.

A signal management CPU 52 is a microprocessor-based subsystem physically identical to the frame management CPU 48. The signal management CPU 52 transfers and formats signalling data between the CIUs 30 and 32 and the satellite channel. Thus, a request for a call connection enters the frame management processor 38 through the signal management CPU 52.

The reference station is used to maintain network synchronization and control of the TDMA burst time plan. The electronics of the reference station, shown in FIG. 5, provides the following functions. It provides the control mechanism so that all ground stations can access the satellite and not interfere with one another. Furthermore, it provides the TDMA frame management functions for operating the communication system in a demand assign mode. The equipment of the reference station closely resembles the equipment shown in FIG. 4 for the ground stations. The MODEM 34 for the reference station is the same as for a ground station.

A frame management processor equipment 60 is identical to the frame management processor equipment 38 of the ground station with the major exception that the reference station does not contain a signal management CPU 52. The DDR interface 40 within the frame management processor equipment 60, instead of being connected to CIUs 30 and 32 as in the ground stations, is instead connected to a frame supervisory processor signal and coding module 62. Other parts of the frame supervisory processor are a frame supervisory CPU 64, a clock distribution unit 66 and an ETHERNET interface module 68. The frame supervisory processor signal and coding module 62 is the same as the signal and coding modules 42 within the ground stations. There are some differences in functionality when the signal and coding module 62 is used in the reference station. Some circuitry in the signal and coding module 42 of the ground station is not used in the reference station and vice versa. The only forward error correction circuitry used in the frame supervisory processor is for correction of the broadcast channel. The forward error correction circuitry for traffic data is not needed since the reference station does not carry traffic. The signal and coding module 62 in the frame supervisory processor contains an additional circuit which is not used in a ground station. This circuitry provides the aperture for monitoring the position error of traffic bursts and is used to generate a correction signal for correcting this burst position at the ground station.

The frame supervisory CPU 64 is physically identical to the frame management CPU 48 in the ground station. It interfaces with the frame management processor equipment 60, the ETHERNET interface module 68 and the frame supervisory processor signal and coding module 62. The frame supervisory CPU 64 does not interface to the frame management processor CPU 48 via a common, arbitrated bus as does the signal management CPU 42 in a ground station. Instead, the frame supervisory CPU 64 interfaces via an HDLC link to the frame management processor equipment 60. HDLC stands for high level data link controller and represents a standard protocol in the industry. The ETHERNET interface module 70 connects other racks of equipment similar to that of FIG. 5 and to an overall network control processor.

The frame supervisory processor signal and coding module 62 performs three primary functions. It is a gateway for the frame supervisory CPU 64 to the satellite link. It monitors the positions of the traffic bursts in the frame and it generates the ground station's preamble.

The frame supervisory CPU 64 uses the signal and coding module 62 to receive broadcast channels from the ground stations in the communication network and to transmit the frame management/command signals back to the ground station. To perform this function, the signal and coding module 62 contains a dual-ported RAM. One port of this RAM is connected to the address and data buses from the frame management processor equipment 60 and the other connected to the bus to the frame supervisory CPU 64. The RAM is divided into two banks and the bank accessible from the side of the frame supervisory processor 60 is alternated each frame. This double buffering allows the frame supervisory CPU to access this RAM at any time during the frame. To measure the position of traffic bursts within the frame, the frame supervisory processor signal and coding modue 62 has a 20-bit counter which runs off the system clock and is reset every frame boundary. When a preamble is received from a ground station, the counter's value is stored so that it can be read by the frame supervisory CPU 64.

The clock distribution unit 66 a separate 2.048 MHz reference signal STD, supplies a 29.952 MHz master clock and transmits a frame start pulse to all the equipment in the reference station. The clock distribution unit 66 contains a stable 29.952 MHz voltage control oscillator which is locked to the reference signal STD by means of a phase-lock loop. A time-of-day input to the frame supervisory CPU 64 provides for the distribution of a common time of day to all ground stations.

We claim:

1. A time division multiple access communication system, comprising:
    a plurality of data stations for transmitting and receiving sub-bursts of data between said stations, each said station being assigned, for transmitting a plurality of repeating sub-bursts, at least one preallocated burst portion of predetermined duration in a repeating frame of predetermined duration, said frame further comprising an overflow portion;
    a reference station;
    means associated with each said data station for receiving a request for transmission of a repeating sub-burst of predetermined duration in said frame and for assigning said requested sub-burst to a previously non-assigned portion of the preallocated burst portion assigned to said each data station if such a nonassigned portion is available, and, if said such a nonassigned portion is not available, transmitting an overflow request for said requested sub-burst to said reference station;
    means associated with said reference station for receiving said overflow request from a requesting data station, assigning a previously non-assigned portion of said overflow portion to said requested sub-burst and transmitting the assignment of said overflow portion to said requesting data station; and
    wherein said requesting data station transmits the requested sub-burst in the portion of said frame assigned to said sub-burst.

2. A communication system, as recited in claim 1, wherein said means associated with each said reference station further periodically redetermines the duration of said preallocated portions.

3. A communication system, as recited in claim 1, wherein said means associated with each said reference station further transmits to said each data station an indication of non-availability if a previously non-assigned portion of said overflow portion is not available.

4. A method for time division multiple access communication, comprising the steps of:
- establishing a repetitive fixed-duration frame for the transmission of data;
- preallocating different burst portions of each said frame to different ones of a plurality of data stations and reserving an overflow portion of said frame;
- requesting a sub-burst of predetermined duration for transmission from one of said data stations;
- assigning said sub-burst to a previously nonassigned portion of the portion preallocated to said one data station if said previously non-assigned portion of said preallocated portion is available; and
- assigning said sub-burst to a previously nonassigned portion of the overflow portion if said previously non-assigned portion of said preallocated portion is not available.

5. A communication method as recited in claim 4, further comprising the step of periodically reallocating said burst portions.

* * * * *

UNITED STATES PATENT AND TRADEMARK OFFICE
CERTIFICATE OF CORRECTION

PATENT NO. : 4,763,325
DATED : August 9, 1988
INVENTOR(S) : Wolfe et al

It is certified that error appears in the above-identified patent and that said Letters Patent is hereby corrected as shown below:

COLUMN 1, LINE 54    Delete "framep" and insert --frame--;

COLUMN 1, LINE 66    Delete "tht" and insert --that--;

COLUMN 2, LINE 12    Delete "fluctions" and insert --fluctuations--;

COLUMN 3, LINE 32    Delete "com unication" and insert --communication--;

COLUMN 3, LINE 60    Delete "capcity" insert --capacity--;

COLUMN 10, LINE 19   Delete "modue" insert --module--;

COLUMN 10, LINE 24   After "66" insert --receives--;

Signed and Sealed this

Seventh Day of February, 1989

Attest:

DONALD J. QUIGG

Attesting Officer

Commissioner of Patents and Trademarks